US006308752B1

(12) United States Patent
Tsukano et al.

(10) Patent No.: US 6,308,752 B1
(45) Date of Patent: Oct. 30, 2001

(54) FILLER

(75) Inventors: Kenichi Tsukano; Katsunori Tanigawa, both of Ishikawa-ken (JP)

(73) Assignee: Shibuya Kogyo Co., Ltd., Kanazawa (JP)

( * ) Notice: Subject to any disclaimer, the term of this patent is extended or adjusted under 35 U.S.C. 154(b) by 0 days.

(21) Appl. No.: 09/650,624

(22) Filed: Aug. 30, 2000

(30) Foreign Application Priority Data

Nov. 16, 1999 (JP) ................................................ 11-325371

(51) Int. Cl.[7] ........................................................ B64B 1/04

(52) U.S. Cl. ............................ 141/290; 141/40; 141/302

(58) Field of Search ............................ 141/39–45, 47–50, 141/59, 285, 289, 290, 301, 302, 308

(56) References Cited

U.S. PATENT DOCUMENTS 5,501,253 * 3/1996 Weiss ..................................... 141/40
6,189,578 * 2/2001 Clusserath ................................ 141/7

FOREIGN PATENT DOCUMENTS 2615218 3/1997 (JP) .

* cited by examiner

*Primary Examiner*—Steven O. Douglas
(74) *Attorney, Agent, or Firm*—Flynn, Thiel, Boutell & Tanis, P.C.

(57) ABSTRACT

In a filler, a preliminary substitution in which a carbonate gas within a storage tank is substituted into a vessel interior takes place by opening a first gas discharge valve and a first gas valve, followed by a proper substitution in which a genuine carbonate gas in a chamber is substituted into the vessel interior by opening a second gas valve and the first gas discharge valve while closing the first gas valve, and subsequently followed by a pressurization in which the vessel interior is pressurized to the same pressure as in the storage tank by opening the second gas valve while closing the first gas discharge valve. Subsequently, a liquid valve is opened as the second gas valve is closed and the first gas valve is opened to fill the vessel with a liquid while discharging the genuine carbonate gas in the vessel into the storage tank. In this manner, a filling operation can take place while a carbonate gas of a higher concentration than the conventional practice is substituted into the vessel interior.

5 Claims, 5 Drawing Sheets

FILLER

FIELD OF THE INVENTION

The invention relates to a filler, and more particularly, to a filler which allows a preliminary substitution of a vessel interior by a gas before a filling operation takes place.

DESCRIPTION OF THE PRIOR ART

A filler is known in the art which allows a preliminary substitution of a vessel interior by a gas before a filling operation takes place and including a storage tank for storing an inactive and a liquid, a supply of genuine inactive, a filling valve connected to the storage tank and the supply, a receptacle disposed below the filling valve and on which a vessel is placed, the filling valve comprising a liquid passage connected to the storage tank for feeding the liquid into a vessel, a liquid valve for opening and closing the liquid passage, a first gas passage connected to the storage tank for feeding the inactive into the vessel, a first gas valve for opening and closing the first gas passage, a second gas passage connected to the supply for feeding the genuine inactive into the vessel, a second gas valve for opening and closing the second gas passage, a gas discharge passage providing a communication between the interior of the vessel and an exterior thereof, and a first gas discharge valve for opening and closing the gas discharge passage (Japanese Patent No. 2,615,218).

In the above filler, a preliminary substitution of a vessel interior with an inactive takes place by opening the first gas discharge valve and the first gas valve, and is followed by a proper substitution by the genuine inactive by opening the second gas valve to pressurize the interior of the vessel while closing the first gas discharge valve and the first gas valve, and is then followed by a pressurization to pressurize the interior of the vessel with the inactive by opening the first gas valve while closing the second gas valve. When a pressure balance is reached between the vessel and the storage tank, the liquid valve is automatically opened to perform a filling operation, and when a given quantity of the liquid is filled into the vessel to close the liquid valve and the first gas valve, the gas discharge valve is opened to perform a snift operation.

In the filler, the genuine inactive is discharged into the storage tank during the proper substitution to be reused as the inactive during the preliminary substitution, and thus a filling operation can take place through the substitution of the vessel interior with a high concentration gas while achieving a saving in the gas consumption.

However, because the pressure of the genuine inactive in the supply is chosen to be lower than the pressure within the storage tank, in order to achieve a pressure balance between the vessel and the storage tank to open the liquid valve, it is required that subsequent to the substitution with the genuine inactive, the first gas valve be opened again to feed the inactive into the vessel, resulting in an actual gas concentration within the vessel on the order of 95%.

More specifically, referring to FIG. 5 which illustrates a conventional gas-charging filling operation, a pressurizer valve 137 (first gas valve) is opened and closed directly by operating a lever F; and a filling valve 112 (liquid valve) is allowed to be opened without being opened by the operation of the lever F, but is closed directly by the lever F. In particular, the filling valve 112 (liquid valve) continues to be seated on a valve element D even after it is released from the action of the lever F which urges it forcibly, and is automatically opened upon reaching a pressure balance between a canister 102 (vessel) and a circular reservoir 104 (storage tank).

Accordingly, if the lever F is operated to open the pressurizer valve 137 (first gas valve) and to release the filling valve 112 (liquid valve) under the condition that the interior of the canister 102 (vessel) is pressurized to a higher level than the circular reservoir 104 (storage tank), the genuine inactive within the canister 102 (vessel) would pass not only into a top space within the circular reservoir (storage tank) through a return gas pipe 114 (first gas passage), but also drives the filling valve 112 (liquid valve) up energetically to be released into a beverage (liquid) within the circular reservoir 104 (storage tank) through a liquid passage 113 to cause a bubbling in the beverage (liquid), which is undesirable. Thus, there has been a need in the conventional filler to assure a pressure balance with the internal pressure of the storage tank by using the inactive within the storage tank to pressurize the vessel interior in order to avoid such risk.

SUMMARY OF THE INVENTION

In view of the foregoing, it is an object of the invention to provide a filler which allows a filling operation to take place under a condition that a high concentration gas is substituted into a vessel interior.

Specifically, in accordance with the present invention, there is provided a filler including a storage tank for storing a first gas and a liquid, a supply of a second gas, a filling valve connected to the storage tank and the supply, a receptacle disposed below the filling valve and on which a vessel is placed, means for detecting a quantity of liquid filled, the filling valve comprising a liquid passage connected to the storage tank for feeding the liquid into a vessel, a liquid valve for opening and closing the liquid passage, a first gas passage connected to the storage tank for feeding the inactive into the vessel, a first gas valve for opening and closing the first gas passage, a second gas passage connected to the supply for feeding the genuine inactive into the vessel, a second gas valve for opening and closing the second gas passage, a first gas discharge passage providing a communication between the interior of the vessel and an exterior thereof, and a first gas discharge valve for opening and closing the first gas discharge passage, and a controller for receiving a signal from the filled volume detecting means and for closing the liquid passage when the filled volume in the vessel reaches a given value; characterized in that the pressure of the second gas from the supply is equal to or higher than the pressure in the storage tank, the controller being adapted to control at least the liquid valve such that upon completion of a preliminary substitution of a vessel interior with the first gas by opening the first gas discharge valve and the first gas valve, followed by a proper substitution of the vessel interior with the second gas by opening the second gas valve and the first gas discharge valve while closing the first gas valve, and subsequently followed by a pressurization of the vessel interior to a pressure equal to or higher than the pressure in the storage tank, the controller subsequently allowing the liquid valve to be opened as the second gas valve is closed and the first gas valve is opened to fill the vessel with the liquid while discharging the gas in the vessel to the storage tank through the first gas passage, the controller closing the liquid valve to stop a filling operation when the filled volume in the vessel reaches a given value.

In accordance with the present invention, the first gas comprises an inactive and the second gas comprises a genuine inactive, whereby the preliminary substitution takes place with the inactive and the proper substitution takes place with the genuine inactive, which is also used in the pressurization.

During the pressurization, the controller closes the liquid valve, and accordingly, the genuine inactive in the vessel cannot be released into the storage tank through the liquid valve.

Consequently, a filling operation can take place while the vessel interior is substituted with the gas of a higher concentration than in the conventional practice.

Above and other objects, features and advantages of the invention will become apparent from the following description with reference to the attached drawings.

DETAILED DESCRIPTION OF THE EMBODIMENT

Figure 1:
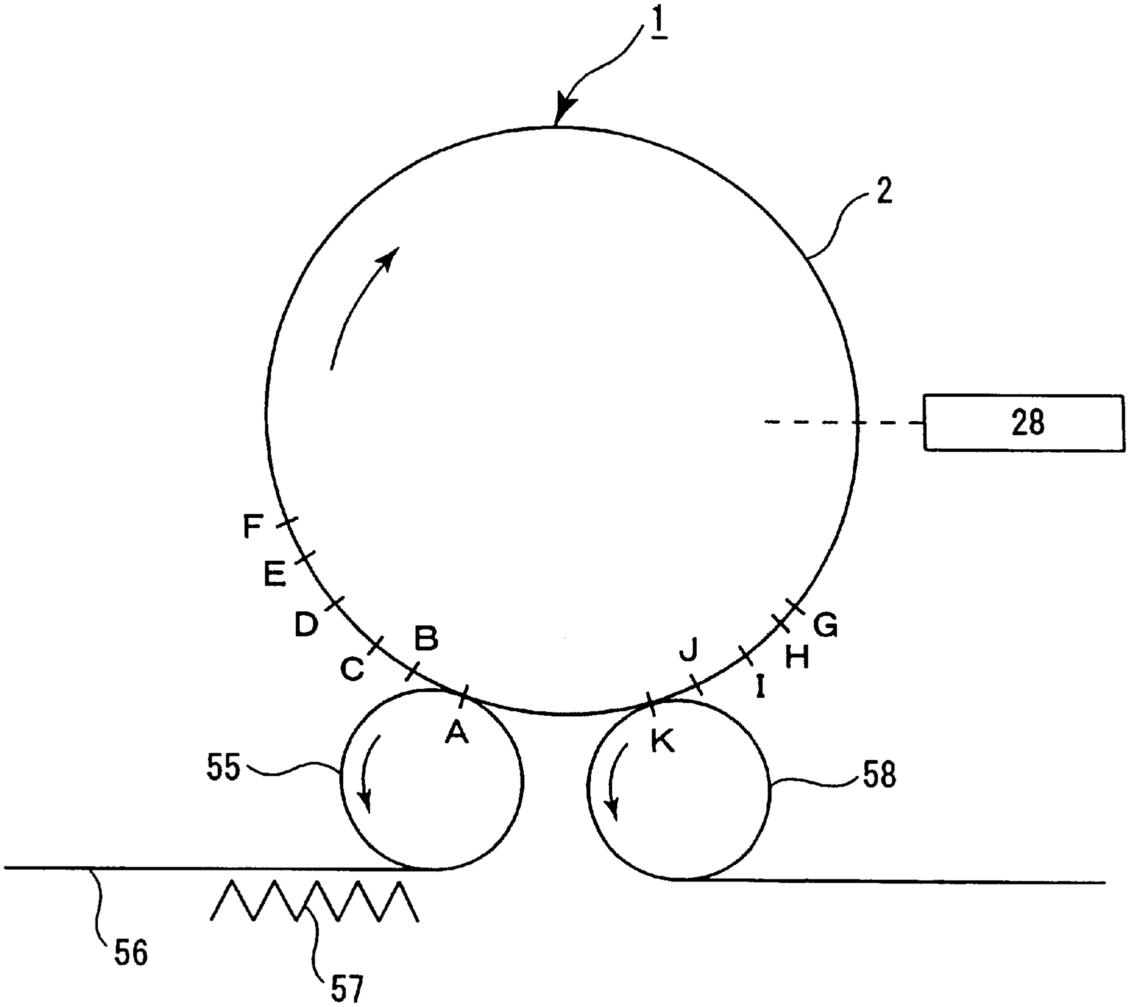
FIG. 1 is a schematic plan view of one embodiment of the invention.

Several embodiments of the present invention will now be described with reference to the drawings. Referring to FIG. 1, there is shown a rotary filler according to the present invention which includes a revolving body 2 which is rotatably mounted. A plurality of filling valves 3, each of which is used to fill a vessel with a liquid to be filled, are disposed around the revolving body 2 at positions which are circumferentially spaced apart at an equal interval, and receptacles, not shown, are disposed below each filling valve 3 to have a vessel placed thereon.

An annular storage tank 4 is disposed above the revolving body 2 and is arranged to rotate integrally therewith, and is associated with an annular chamber 5 which is mounted on top of the storage tank 4. A lower space within the storage tank 4 contains a liquid to be filled such as carbonate beverage, and an inactive in the form of the carbonate gas (first gas) is confined in an upper space thereof. A supply, not shown, feeds genuine carbonate gas (second gas) serving as a genuine inactive of a higher purity than the first gas into the chamber 5, and the pressure of the genuine inactive which is fed into the chamber 5 is chosen to be above the atmospheric pressure so as to be equal to or higher than the pressure in the upper space of the storage tank 4 which is chosen to be substantially constant.

It is to be understood that while the storage tank 4 is pressurized by blowing a genuine carbonate gas thereinto in preparation to a filling operation, an amount of air remains therein to degrade the purity slightly.

It is to be noted that the inactive used is not limited to a carbonate gas, but may comprise nitrogen or otherwise, and the first and the second gas may be of different varieties.

Figure 2:
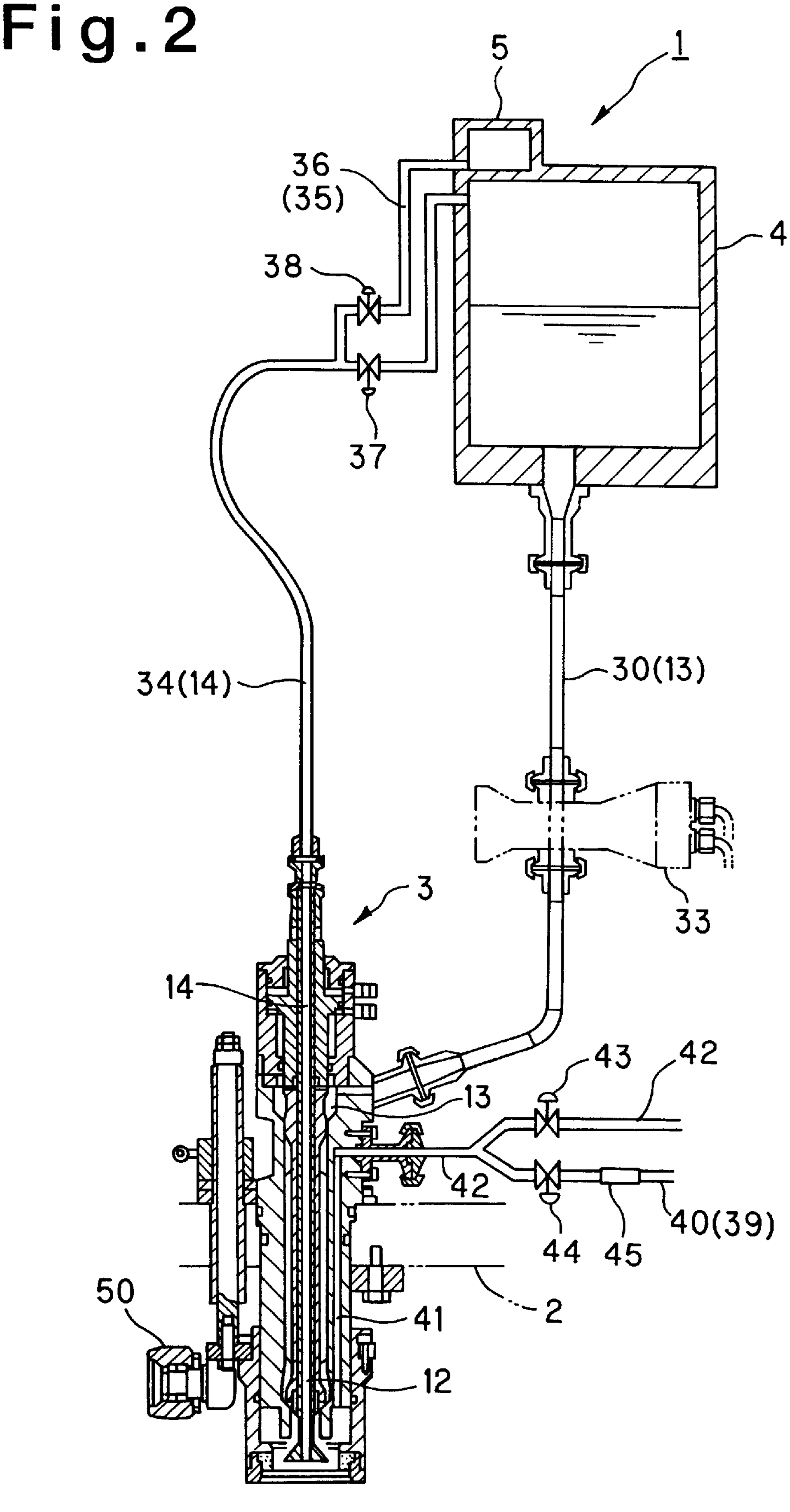
FIG. 2 is a cross section showing a filling valve 3, a storage tank 4 and a chamber 5.

As shown in FIG. 2, each of the filling valves 3 is fixedly mounted on the revolving body 2 with its bottom facing downward while the receptacle is also fixedly mounted on the revolving body 2 so as to face upward.

Figure 3:
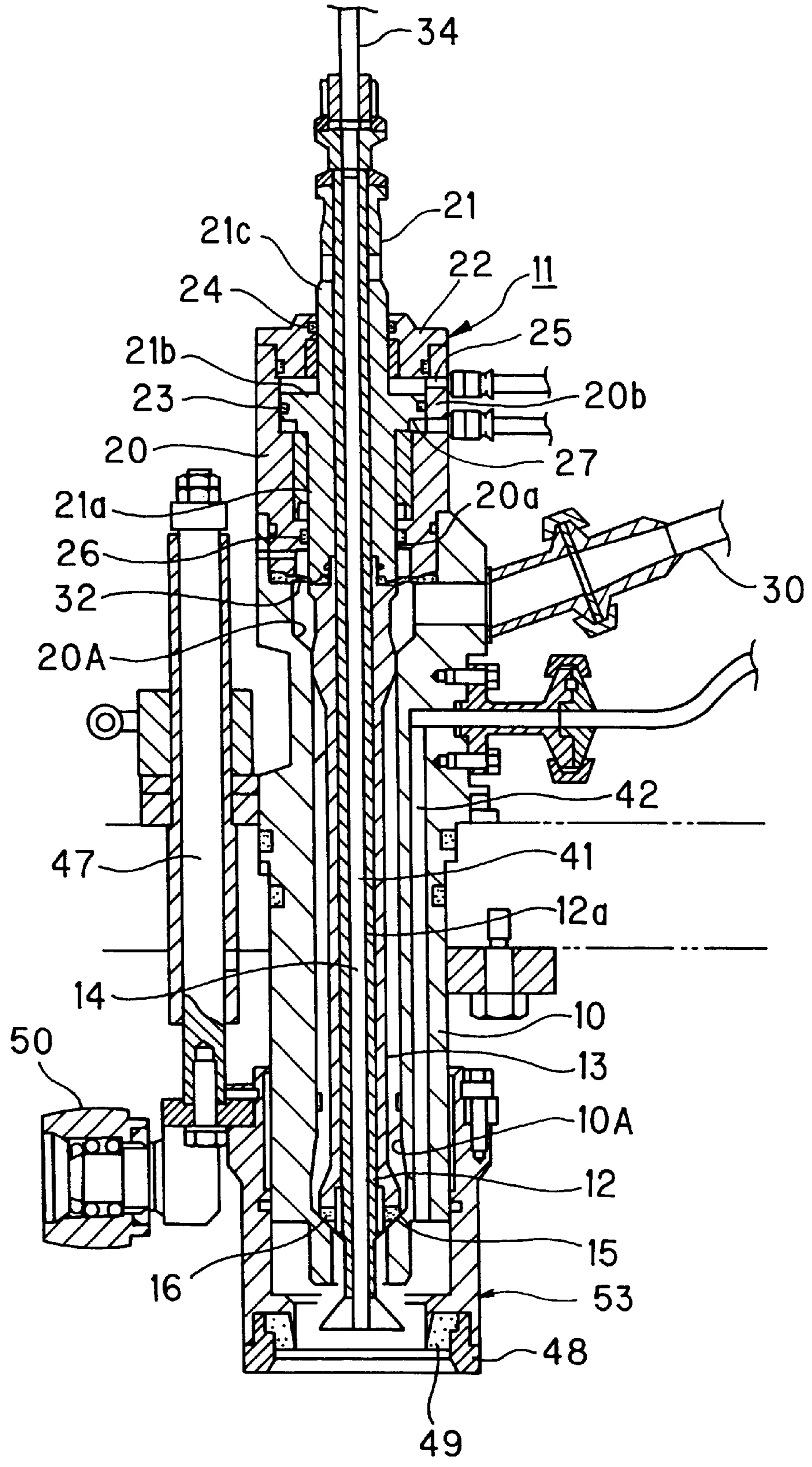
FIG. 3 is an enlarged section of the filling valve 3.

Referring to FIG. 3, the filling valve 3 comprises a substantially tubular housing 10 connected to the revolving body 2, a tubular liquid valve 12 mounted in a stepped opening 10A within the housing 10 in an elevatable manner and which is driven up and down by a cylinder mechanism

11 to be described later, a liquid passage 13 defined between the outer periphery of the liquid valve 12 and the inner periphery of the housing 10, and a sleeve 12*a* fitted into an axial bore of the liquid valve 12 to form part of a first gas passage 14. The step of the stepped opening 10A of the housing 10 defines a valve seat 15, and a valve element 16 comprising a ring of resilient material is attached to the lower end of the liquid valve 12, thus allowing the liquid passage 13 to be opened and closed by engaging the valve element 16 with or disengaging it from the valve seat 15.

The cylinder mechanism 11 comprises a cylinder housing 20 connected to the top end of the housing 10, and a piston 21 slidably fitted into an axial portion of the cylinder housing 20, the liquid valve 12 being connected to the lower end of a lower portion 21*a* of the piston 21.

The lower portion 21*a* of the piston 21 is slidably fitted into a small diameter portion 20*a* of the cylinder housing 20, and an annular seal member 26 is mounted around the inner peripheral surface of the small diameter portion 20*a* to maintain a air tight with the lower portion 21*a*. An intermediate bulge 21*b* is connected to the upper end of the lower portion 21*a* and is slidably fitted into a large diameter portion 20*b* of the cylinder housing 20, with an annular seal member 23 being applied around the outer peripheral surface of the intermediate bulge 21*b* to maintain a air tight with the large diameter portion 20*b*. An upper portion 21*c* is connected to the upper end of the intermediate bulge 21*b* to extend slidably through a lid member 22 which closes the top end of the cylinder housing 20 to the outside thereof, with an annular seal member 24 being mounted around the inner peripheral surface of the lid member 22 to maintain a air tight with the upper portion 21*c*.

A first pressure chamber 25 is defined by a closed space formed by the large diameter portion 20*b* of the cylinder housing 20, the lid member 22 and the upper portion 21*c* and the intermediate bulge 21*b* of the piston 21, and communicates with a supply of pressure fluid through a switching valve, not shown.

A second pressure chamber 27 is defined by a closed space formed between the large diameter portion 20*b* of the cylinder housing 20, and the lower portion 21*a* and the intermediate bulge 21*b* of the piston 21, and communicates with a supply of pressure fluid through a switching valve, not shown.

Consequently, when the first pressure chamber 25 which is located upward communicates with the supply of pressure fluid while the second pressure chamber 27 which is located downward communicates with the atmosphere, the piston 21 and the liquid valve 12 which is connected thereto move down, whereby the valve element 16 is seated on the valve seat 15 to close the liquid passage 13.

On the other hand, when the first pressure chamber 25 which is located upward communicates with the atmosphere while the second pressure chamber 27 which is located downward communicates with the supply of pressure fluid, the piston 21 and the liquid valve 12 which is connected thereto rise, whereby the valve element 16 is removed from the valve seat 15 to open the liquid passage 13.

It is to be noted that the switching valve mentioned above is controlled by a controller 28 (see FIG. 1) which will be described later.

The liquid passage 13 which is formed between the housing 10 and the liquid valve 12 communicates with the lower portion within the storage tank 4 through a pipe 30 connected to the housing 10, the pipe 30 substantially forming part of the liquid passage 13.

A diaphragm 32 has its inner periphery held sandwiched in a liquid tight manner between the liquid valve 12 and the piston 21 while the outer periphery of the diaphragm 32 is held sandwiched in a liquid tight manner between the housing 10 and the cylinder housing 20, the diaphragm 32 also forming part of the liquid passage 13.

A flow meter 33 (see FIG. 2) serving as means for detecting a filled volume by determining a flow rate of the liquid to be filled is disposed in the pipe 30, and a value detected by the flow meter 33 is input to the controller 28.

It should be understood that the means for detecting the filled volume is not limited to the flow meter 33 mentioned above, but may comprise a level sensor which detects the liquid level of the liquid which is filled into the vessel.

The sleeve 12*a* is fitted into and extends through the axial bore in the piston 21, and its top end is connected to a pipe 34, which forms part of the first gas passage 14 which communicates with the upper space within the storage tank 4. A flexible hose is used to form the pipe 34 so as to be capable of moving up and down in accordance with the movement of the piston 21 which is driven up and down.

A first gas valve 37 is disposed in the pipe 34 to open and close the first gas passage 14 under the control of the controller 28. The first gas valve 37 is opened during the preliminary substitution and during the filling operation.

A pipe 35 comprising a flexible hose which communicates with the chamber 5 is connected to the pipe 34 at a location which is closer to the vessel than the first gas valve 37, and substantially defines a second gas passage 36 which communicates with the interior of a vessel through the pipe 34 which defines the first gas passage 14. A second gas valve 38 which opens and closes the second gas passage 36 under the control of the controller 28 is disposed in the pipe 35, and the second gas valve 38 is opened during the proper substitution and during the pressurization.

An axially extending first gas discharge passage 41 (see FIG. 3) is formed in the housing 10 of the filling valve 3, and has an opening which is connected to a pipe 42 which substantially forms part of the first gas discharge passage 41 and which communicates with the outside. A first gas discharge valve 43 (see FIG. 2) which is controlled by the controller 28 is disposed in the pipe 42 (or the first gas discharge passage 41), and is opened during the preliminary substitution and the proper substitution.

A pipe 39 is connected to the pipe 42 (first gas discharge passage 41) at a location closer to the vessel than the first gas discharge valve 43 to communicate it with the exterior, the pipe 39 substantially defining a second gas discharge passage 40. A second gas discharge valve 44 which opens and closes the second gas discharge passage 40 under the control of the controller 28 is disposed in the second gas discharge passage 40, and is opened upon completion of the filling operation.

An orifice 45 is disposed at a location downstream of the second gas discharge valve 44 to allow the pressure within the vessel to be gradually decreased. In this manner, the gas discharge per unit time is throttled to allow it to be reduced below the discharge through the pipe 42 (first gas discharge passage 41).

Referring to FIG. 3, a cover 53 which slides up and down while maintaining a air tight is mounted around the outer periphery of the housing 10 at its lower end in an elevatable manner. At its lower end, the cover 53 includes an annular guide 48 against which a mouth of a vessel can be centered, and an annular seal 49 located inward of the guide 48 and against which the mouth of a vessel is pressed. The combination of the guide 48 and the annular seal 49 forms together a cover 53.

At its top end, the cover 53 is connected to an elevating rod 47 which is slidably disposed along the outside of the housing 10 to move up and down vertically. A cylinder mechanism, not shown, which normally urges the elevating rod 47 and the cover 53 downward is connected to the top end of the elevating rod 47.

At its lower end, the elevating rod 47 rotatably carries a cam follower 50, which allows a vessel to be supplied or removed by raising the cover 53 against the action of the cylinder mechanism when it is engaged with a cam member, not shown, disposed from a rising position J to a descending position B shown in FIG. 1 while allowing the vessel to be constrained by the cover 53 under the control of the cylinder mechanism when it is not engaged with the cam member in a region from the descending position B to the rising position J, thus maintaining a air tight between the filling valve 3 and the vessel by means of the cover 53.

For use with the described arrangement, vessels which are fed from a cleaning unit, not shown, onto a conveyor 56 are separated from each other at a given spacing by means of a timing screw 57 which is located downstream of the conveyor 56 to be sequentially handed onto individual receptacles of the filler 1 through a feeder star-wheel 55.

The receptacle on which a vessel is placed and the filling valve 3 which is located above it are adapted to rotate clockwise as the revolving body 2 rotates, and when the receptacle and the filling valve 3 reach the descending position B, the cam follower 50 which has been engaged with the cam member to remain at its upper position as well as the cover 53 move down.

When the cover 53 moves down, the guide 48 is fitted around the mouth of the vessel to allow the vessel to be centered while the annular seal 49 is pressed against the mouth of the vessel to maintain a air tight between the filling valve 3 and the vessel.

As the revolving body 2 further rotates to bring the receptacle on which the vessel is placed and the filling valve 3 to a position C where the preliminary substitution is initiated, the controller 28 then opens the first gas valve 37 and the first gas discharge valve 43 which have been kept closed and feeds the carbonate gas within the storage tank 4 into the vessel through the first gas passage 14, the carbonate gas fed expelling the air within the vessel through the first gas discharge passage 41 to substitute the carbonate gas within the storage tank 4 into the vessel interior, thus achieving the preliminary substitution.

As the revolving body 2 further rotates to bring the receptacle and the filling valve 3 to a position D where the proper substitution is initiated, the controller 28 closes the first gas valve 37 to terminate the preliminary substitution and opens the second gas valve 38 to feed the genuine carbonate gas into the vessel through the second gas passage 36, thus expelling the carbonate gas which has been previously fed through the first gas discharge passage 41 to perform the proper substitution in which the genuine carbonate gas is substituted into the vessel.

When the receptacle and the filling valve 3 move to a position E for the pressurization while performing the proper substitution, the controller 28 closes the first gas discharge valve 43. Accordingly, the pressure of the genuine carbonate gas gradually rises within the vessel, and when the receptacle and the filling valve 3 moves to a position F where the filling operation is initiated, the controller 28 closes the second gas valve 38 to terminate the pressurization. Under this condition, the pressure within the vessel is equal to or slightly higher than the pressure in the upper space within the storage tank 4.

At the position F where the filling operation is initiated, the controller 28 opens the first gas valve 37 and opens the first pressure chamber 25 in the cylinder mechanism 11 to the atmosphere and feeds the pressure fluid into the second pressure chamber 27, thus causing the piston 21 and the liquid valve 12 to rise.

Accordingly, if the pressure in the vessel is higher than the pressure within the storage tank 4, the gas within the vessel cannot be blown into the storage tank 4 through the liquid passage 13 when the liquid valve 12 is opened because the valve element 16 of the liquid valve 12 is removed from the valve seat 15 on the housing 10 when a pressure balance is reached between the vessel and the storage tank, thus allowing the liquid to be filled to flow down through the clearance between the valve element 16 and the valve seat 15 while discharging the genuine carbonate gas which has been substituted into the vessel into the storage tank 4 through the first gas passage 14.

The genuine carbonate gas from the vessel supplements the consumption of the carbonate gas in the storage tank 4 while simultaneously improving the concentration of the carbonate gas in the storage tank 4. In this manner, the carbonate gas in the storage tank 4 is discharged externally through the vessel while the genuine carbonate gas within the chamber 5 is released into the storage tank 4 through the vessel, whereby the concentration of the carbonate gas in the storage tank 4 rises gradually until it reaches substantially the same level as the concentration of the carbonate gas which prevails in the vessel after the proper substitution.

The filling operation into the vessel which is initiated at the position F is completed until it reaches the position G which represents the termination of the filling operation. In the meantime, the controller 28 monitors a flow rate which is input from each flow meter 33, and when the flow rate reaches a given value, the controller releases the pressure fluid from the second pressure chamber 27 of the cylinder mechanism 11 while filling the pressure fluid into the first pressure chamber 25 to cause the piston 21 and the liquid valve 12 to descend.

As a consequence, the valve element 16 of the liquid valve 12 becomes seated upon the valve seat 15 on the housing 10 to close the liquid passage 13, thus terminating the filling operation of the liquid to be filled. After the liquid passage 13 is closed, the first gas valve 37 is closed to interrupt the communication between the interior of the vessel and the storage tank 4. When the filling operation is terminated, the liquid level within the vessel remains stationary below the lower opening of the first gas passage 14.

When the filling valve 3 and the receptacle reach a position H where the gas discharge is initiated after the termination of the filling operation, the controller 28 opens the second gas discharge valve 44 to release the gas within the vessel externally in a gradual manner through the second gas discharge passage 40 to allow the internal pressure to be reduced gradually, thus preventing any remaining gas within the pipe 34 from being energetically blown into the vessel to cause a bubbling of the filled liquid while releasing the pressure from the interior of the vessel (snift operation). When a position I where the gas discharge is terminated is reached, the second gas discharge valve 44 is closed to terminate the gas discharge (or snift operation).

Subsequently, when the receptacle and the filling valve 3 move to the rising position J, the cam follower 50 which engages the cam member allows the cover 53 to be raised, whereby the vessel which is released is removed through a removal star-wheel 58 at a downstream removal position K.

It will be understood from the foregoing description that in the present embodiment, the preliminary substitution takes place with the carbonate gas from the storage tank 4 while the proper substitution and the pressurization take place only with the genuine carbonate gas, and thus the filling operation can take place under the condition that the carbonate gas of a higher concentration than the prior art is substituted into the vessel.

In the described embodiment, both the second gas discharge passage 40 and the second discharge valve 44 are provided. However, they may be omitted in some instance, and in such instance, the orifice 45 may be disposed in the first gas discharge passage 41 so that it serves the gas discharge during the preliminary substitution and the proper substitution as well as during the gas discharge (snift operation) upon completion of the filling operation.

Figure 4:
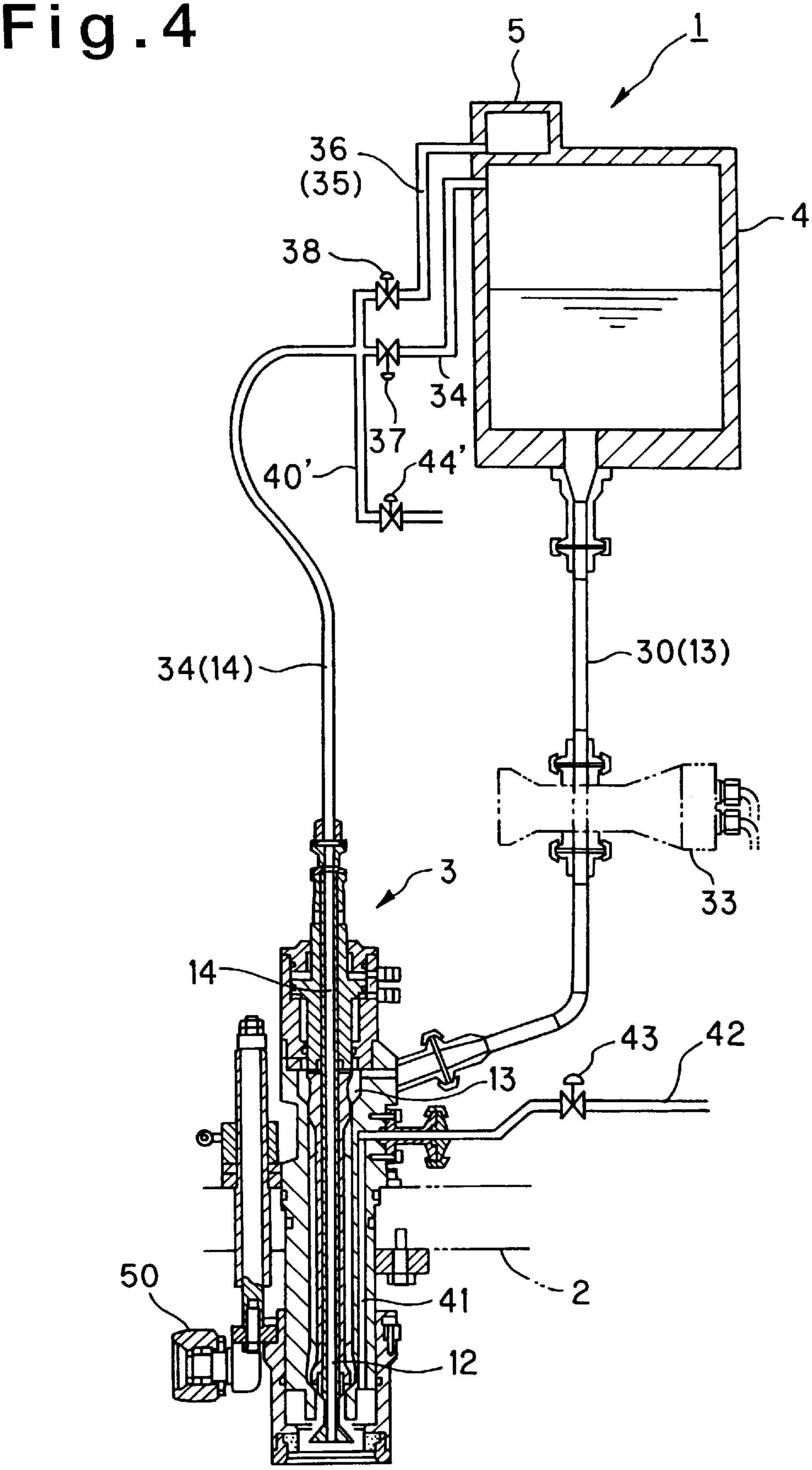
FIG. 4 is a cross section of a second embodiment of the invention.
Figure 5:
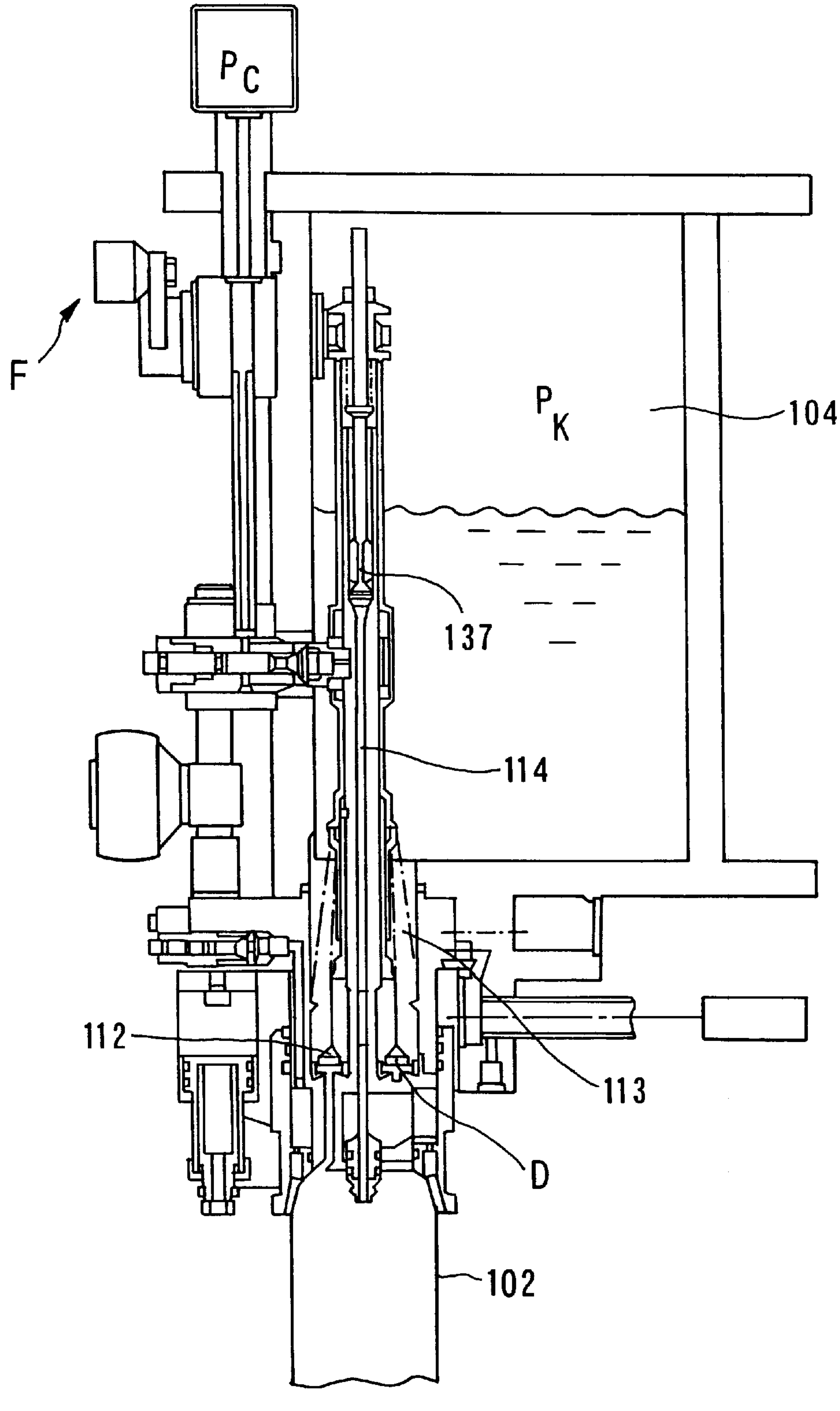
FIG. 5 is a schematic cross section illustrating a conventional gas-charging filling operation.

FIG. 4 shows a second embodiment of the invention. In the first embodiment, the second gas discharge passage 40 is connected to the pipe 42 (first gas discharge passage 41), but in the present embodiment, a second gas discharge passage 40' is connected to the pipe 34 at a location where the second gas passage 36 has been connected to the pipe 34 or at a location closer to the vessel than the first gas valve 37 and the second gas valve 38. A second gas discharge gas valve 44' is disposed in the second gas discharge passage 40'.

The operation of the liquid valve 12, the first gas valve 37 and the second gas valve 38 remains similar to that described in connection with the first embodiment except that the gas discharge operation from the gas discharge initiation position H to the gas discharge termination position I takes place through the second gas discharge valve 44', and in other respects, the arrangement is similar to that of the first embodiment, and accordingly, corresponding parts to those shown in the first embodiment are designated by like numerals as used in the first embodiment.

It will be evident that the second embodiment is capable of achieving a similar functioning and effect as achieved by the first embodiment. In addition, a bubbling of a liquid to be filled which may result from blowing any remaining gas in the pipe 34 into the vessel during the gas discharge upon termination of the filling operation is avoided, thus dispensing with the provision of the orifice 45 as shown in the first embodiment, thus allowing the time interval required for the gas discharge (snift operation) to be reduced as compared with the first embodiment.

In the second embodiment, only the second gas discharge valve 44' is opened during the snift operation upon termination of the filling operation, but the arrangement is not limited thereto, but the first gas discharge valve 43 may be opened after the second gas discharge valve 44' has been opened.

In both the first and the second embodiment, the second gas passage 36 communicates with the interior of the vessel through the pipe 34 (first gas passage 14) or the pipe 34 serves the combined action of the first gas passage 14 and the second gas passage 36, but the arrangement is not limited thereto, and each passage may be independently formed. In this instance, the second gas discharge passage 40' may also be disposed in the second gas passage 36 in addition to the first gas passage 14.

In both the first and the second embodiment, the controller 28 has been described as controlling all of the valves, but the arrangement is not limited thereto.

While the invention has been disclosed above in connection with several embodiments thereof, it should be understood that a number of changes, modifications and substitutions therein are possible from the above disclosure without departing from the spirit and the scope of the invention, and therefor it should be understood that the scope of the invention is solely defined by the appended claims.

What is claimed is:

1. A filler including a storage tank for storing a first gas and a liquid, a supply of a second gas, a filling valve connected to the storage tank and the supply, a receptacle disposed below the filling valve and on which a vessel is placed, and means for detecting a filled volume of liquid, the filling valve comprising a liquid passage connected to the storage tank for feeding the liquid into the vessel, a liquid valve for opening and closing the liquid passage, a first gas passage connected to the storage tank for feeding the first gas into the vessel, a first gas valve for opening and closing the first gas passage, a second gas passage connected to the supply for feeding the second gas into the vessel, a second gas valve for opening and closing the second gas passage, a first gas discharge passage for providing a communication between the interior of the vessel and an exterior thereof, and a first gas discharge valve for opening and closing the first gas discharge passage, and further including a controller for receiving a signal from the means for detecting the filled volume and for closing the liquid passage when the filled volume in the vessel reaches a given value;

characterized in that the pressure of the second gas of the supply is chosen to be equal to or higher than the pressure in the storage tank, the controller being adapted to control at least the liquid valve such that upon completion of a preliminary substitution of a vessel interior with the first gas by opening the first gas discharge valve and the first gas valve, followed by a proper substitution of the vessel interior with the second gas by opening the second gas valve and the first gas discharge valve while closing the first gas valve, and subsequently followed by a pressurization of the vessel interior to a pressure equal to or higher than the pressure in the storage tank, the controller subsequently allowing the liquid valve to be opened as the second gas valve is closed and the first gas valve is opened to fill the vessel with the liquid while discharging the gas in the vessel to the storage tank through the first gas passage, the controller closing the liquid valve to stop a filling operation when the filled volume in the vessel reaches a given value.

2. A filler according to claim 1 in which the first gas discharge valve is opened upon termination of the filling operation.

3. A filler according to claim 1 in which the filling valve comprises a second gas discharge passage which provides a communication between the interior and the exterior of the vessel and having a discharge per unit time which is less than that of the first gas discharge passage, and a second gas discharge valve for opening and closing the second gas discharge passage, the second gas discharge valve being opened alone upon termination of the filling operation.

4. A filler according to claim 1 in which the filling valve comprises a second gas discharge passage connected to the first gas passage at a location closer to the vessel than the first gas valve for communicating the passage with the exterior, and a second gas discharge valve for opening and closing the second gas discharge passage, the second gas discharge valve being opened either along or together with the first gas discharge valve upon termination of the filling operation.

5. A filler according to claim 1 in which both the first gas and the second gas comprises an inactive and the second gas has a purity which is higher than the purity of the first gas.

* * * * *